(12) United States Patent
Davis (10) Patent No.: US 8,919,033 B2
(45) Date of Patent: Dec. 30, 2014

(54) SNAGLESS BLADED FISHING LURE

(75) Inventor: James Ronald Davis, Rock Hill, SC (US)

(73) Assignee: Davis Fishing Technologies, Inc., Edisto Island, SC (US)

( * ) Notice: Subject to any disclaimer, the term of this patent is extended or adjusted under 35 U.S.C. 154(b) by 0 days.

(21) Appl. No.: 13/216,545

(22) Filed: Aug. 24, 2011

(65) Prior Publication Data

US 2013/0047491 A1 Feb. 28, 2013

(51) Int. Cl.
| *A01K 85/14* | (2006.01) |
| *A01K 85/00* | (2006.01) |
| *A01K 85/02* | (2006.01) |

(52) U.S. Cl.
CPC ................ *A01K 85/02* (2013.01); *A01K 85/14* (2013.01)
USPC ....... 43/42.39; 43/42.47; 43/42.49; 43/42.03; 43/42.5; 43/42.52

(58) Field of Classification Search
USPC .............. 43/42.47, 42.39, 42.49, 42.5, 42.52, 43/42.03, 42.15
See application file for complete search history.

(56) References Cited

U.S. PATENT DOCUMENTS

| 1,928,367 | A | * | 9/1933 | Buddle | 43/42.29 |
| 2,205,472 | A | * | 6/1940 | Fagerholm | 43/42.52 |
| 2,523,831 | A | * | 9/1950 | Koski | 43/42.15 |
| 2,566,029 | A | | 8/1951 | Louthan | |
| 2,741,863 | A | | 4/1956 | Magill | |
| 2,948,984 | A | * | 8/1960 | Crawford | 43/42.39 |
| 3,090,152 | A | * | 5/1963 | Helin | 43/42.47 |
| 3,401,483 | A | | 9/1968 | Bellah et al. | |
| 3,543,431 | A | | 12/1970 | Olds | |
| 3,667,148 | A | | 6/1972 | Dawson | |
| 3,708,904 | A | | 1/1973 | Zaharis | |
| 3,863,382 | A | | 2/1975 | Heili | |
| 3,971,154 | A | | 7/1976 | Craig | |
| 4,201,006 | A | * | 5/1980 | Wetherald | 43/42.06 |
| 5,020,267 | A | | 6/1991 | Rasmussen | |
| 5,857,283 | A | * | 1/1999 | Perrick | 43/42.5 |
| 5,918,406 | A | * | 7/1999 | Wilson | 43/42.28 |
| 6,018,903 | A | | 2/2000 | Miralles | |
| 7,028,430 | B2 | * | 4/2006 | Gironda | 43/42.22 |
| 7,444,778 | B2 | | 11/2008 | Snowberger | |
| 7,627,978 | B2 | * | 12/2009 | Davis | 43/42.15 |
| 7,726,062 | B2 | * | 6/2010 | Davis | 43/42.15 |
| 2008/0172925 | A1 | | 7/2008 | Hazel | |
| 2009/0211145 | A1 | * | 8/2009 | Thorne | 43/42.39 |

* cited by examiner

*Primary Examiner* — Darren W Ark
*Assistant Examiner* — Lisa Tsang
(74) *Attorney, Agent, or Firm* — Tim St. Clair; Nexsen Pruet, LLC (57) ABSTRACT

A snagless bladed fishing lure is provided in which the blade oscillates side-to-side during retrieval and pitches forward to protect the hook from snagging upon encountering an obstacle. The blade includes a line keeper and a hook receiver and carries a weight, the hook receiver being located between the line keeper and the weight.

18 Claims, 8 Drawing Sheets

SNAGLESS BLADED FISHING LURE

TECHNICAL FIELD

The present invention relates generally to a snagless bladed fishing lure and, more particularly, to a fishing lure with a blade that oscillates side-to-side during retrieval but that pitches forward to protect the hook from snagging upon an obstacle.

BACKGROUND

Anglers practice many techniques to attract fish to the hook. Lures carrying live bait, lures assembled of entirely artificial components, and lures with both live bait and artificial elements may be used. Blades may also be attached and structured to provide additional movement and/or attractive flashing light. The lures may include devices that impart sound to the surrounding water as the lures pass through the water. Lures may also be configured to travel in nonlinear paths while retrieved through the water.

Anglers also often employ various mechanisms to protect their lures from snagging underwater obstacles while being fished. A snagged lure catches no fish and, if the fishing line breaks, a snagged lure is lost. The known techniques for improving the snag resistance of a fishing lure involve sheltering the barb of the lure hook from catching upon an obstacle. One type of design includes a spring-loaded bail that rests against the hook barb; the bail is intended to collapse away from the barb upon pressure from the mouth of a striking fish. A second type of design uses a leading fairing in close proximity to the hook barb; the fairing is intended to be close enough to the barb either to deflect the obstacle away from the barb or to deflect the lure away from the obstacle, but far enough away from the bard to allow a fish to catch upon the barb. A third type of design simply buries the hook bard in a pliable membrane; the membrane is intended to be sufficiently resilient to prevent the hook barb from passing through the membrane and catching on an interfering obstacle but sufficiently pliable to allow the hook barb to pass through and catch a striking fish. All three designs are regrettably suspected of reducing the number of fish hooked. Ideally, a fishing lure would have a hook that is unobstructed for biting by a fish but is still resistant to snagging by reason of the functionality of the lure, but the known techniques fail that ideal.

Unfortunately, the known devices and configurations for seeking any particular objective with a fishing lure design are of limited effectiveness in accomplishing any other, second objective and, in many respects, may frustrate the accomplishment of a second objective. For example, the known fishing lure blade systems, used to provide an attractive flashing of light from the lure during retrieval, at best serve no complementary purpose in furthering any second particular fishing method, such as, for example, improving the lure's resistance to snagging; instead, to enjoy both the first benefit of a blade and the second benefit of snag resistance, separate blade systems and snag resistance systems must be used and they must be carefully configured so as not to interfere with one another (e.g., a moving blade ought not strike the bail of a snag resistance apparatus) even if such a configuration reduces the effectiveness of either or both systems. The same general problem persists as to other fishing lure techniques. For a second example, the incorporation of a rattle into a fishing lure may impart sound from the lure to the surrounding water, but does nothing to produce the flash of a blade system, nothing to allow for the attachment of live bait (and, in fact, may frustrate the attachment of live bait if the rattle is built into a competing artificial bait component of the lure), and nothing to steer the lure along nonlinear paths through the water; instead, the rattle merely rattles.

In a word, the known devices and configurations for achieving any particular objective with a fishing lure design are, in certain respects, inefficient.

SUMMARY OF THE INVENTION

A snagless bladed fishing lure is disclosed. As revealed in the following description and the appended figures, this invention discovers an elegant and clever fishing lure that achieves several individual fishing lure design objectives.

In accordance with certain aspects of certain aspects of certain embodiments of the present subject matter, a fishing lure is provided that comprises a blade system, a hook system, and a weight system. The blade system may include a blade that has a forward surface, a rearward surface opposite the forward surface, a lower first end, and an upper second end opposite the lower first end. The blade may further include a line keeper. A hook receiver may also be provided. The hook system, in turn, may comprise a hook that includes a connector and a hook end, the connector being engaged with the hook receiver and the hook extending rearwardly from the lure with the hook end residing behind the rear surface of the blade. The weight system may include a weight that is disposed proximate to the lower first end of the blade and may define a weight center of gravity. Configured in accordance with the present invention, the hook receiver is located between the line keeper and the weight center of gravity.

In accordance with additional aspects of other embodiments of the present subject matter, the hook receiver may include at least one hole defined through the blade. In accordance with still further aspects of other embodiments of the present subject matter, the connector may be engaged with the hook receiver by the ring disposed through at least one hole defined through the blade.

In yet still further embodiments of the present subject matter, the connector of the hook may include an eyelet and the eyelet may be disposed through at least one hole defined through the blade.

With regard to additional aspects of other embodiments of the present subject matter, the line keeper may be one or more holes defined through the blade. Alternatively, or additionally, the line keeper may be an eyelet that is carried by the blade. In other embodiments, the line keeper may be a pin that extends through the blade, the pin including a pin eyelet, a pin head, and a pin strut located between the pin eyelet and the pin head. Alternatively, the line keeper may be constructed with a line handle.

In some embodiments of the present subject matter, the lower end of the blade may be understood to have a front side and a back side that is opposite the front side. In such embodiments, the weight center of gravity may reside forward of the backside of the blade.

In yet still further other embodiments of the present subject matter, the blade may define a longitudinal axis that extends between the lower end and the upper end and the blade may be symmetrical about that longitudinal axis.

In accordance with other aspects of other embodiments of the present subject matter, the blade may be pitchable relative to the hook, whereby the upper end of the blade may be pitched closer to and/or further from the hook end of the hook. And yet still further aspects of other embodiments of the present subject matter, the blade may be rollable relative to the hook connector, whereby the upper end of the blade may travel in an arc side-to-side relative to the orientation of the hook, the center of rotation of such arc being approximately the hook connector.

In other embodiments of the present subject matter, the hook receiver may be carried by the weight.

In accordance with still further aspects of other embodiments of the present subject matter, the blade system may include line attaching means for attaching fishing line to the blade. Such line attaching means may include structures such as one or more holes defined through the blade, and eyelet carried by the blade, a pin extending through the blade with a pin head keeping the pin from passing through the blade and a pin eyelet for attaching fishing line, and a line attaching handle carried by the blade.

In accordance with additional aspects of other embodiments of the present subject matter, the lure may include hook attaching means for attaching the hook to the lure. The hook attaching means may include one or more holes defined through the blade, such holes configured for receipt of an eyelet of a hook. Alternatively, the hook attaching means may include a ring that is passed through one or more holes defined through the blade, the ring also passing through an eyelet of a hook, thereby attaching the hook to the blade. Still further alternatively, the hook attaching means may be an eyelet, loop, or bail carried by the weight.

In still further aspects of other embodiments of the present subject matter, the fishing lure may include rolling means for rolling the blade relative to the hook. Such rolling means may be provided by the sizing of the hook attachment means relative to the size of the hook eyelet or the ring, to allow the blade to oscillate in an arc relative to the hook.

In yet still further embodiments of other aspects of the present subject matter, the fishing lure may include pitching means for pitching the blade relative to the hook. By use of such means, the blade may be pitched relative to the hook whereby the upper end of the blade may be pitched closer to and/or further from the hook end of the hook. Such pitching means may be provided by orienting the eyelet of the hook vertically, passing through two holes defined through the blade, along a longitudinal axis of the blade. The eyelet of the hook, passing through such holes, may allow the blade to pitch about such eyelet of the hook. Alternatively, in other embodiments, the pitching means may be provided by a ring passing through one or more holes defined through the blade and also through the eyelet of a hook, whereby the ring may move relative to the eyelet of the hook and the blade of the fishing lure therefore being pitchable relative to the hook whereby the upper end may be pitched closer to and/or further from the hook end.

The foregoing description sets forth broadly certain features of the present invention so that the detailed description hereinbelow may be better understood, and so that the present contributions to the art from this invention may be better appreciated. Additional features of the invention will be described hereinbelow.

The purpose of the Abstract hereinabove is to enable the United States Patent and Trademark Office and the public generally to determine quickly from a cursory inspection the nature and gist of the technical disclosure. The Abstract is not provided for interpreting the scope of the claims herein, nor to define the invention or the application, nor to be limiting in any way as to the scope of the invention.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like. Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

The details of the present invention, both as to its structure and its operation, can be understood with reference to the accompanying figures. It should be noted that these figures are not necessarily to scale in all instances.

DETAILED DESCRIPTION

Reference will now be made in detail to the presently preferred embodiments of the invention, one or more examples of which are illustrated in the figures. Each example is provided by way of explanation of the invention and not meant to be a limitation of the invention. For example, features illustrated or described as part of one embodiment may be used with a different embodiment to yield yet still another embodiment. It is intended that the present application include such modifications and variations as come within the scope and spirit of the invention. Selected combinations or aspects of the disclosed technology correspond to a plurality of different embodiments of the present invention. Certain features may be interchanged with similar devices or different features not expressly mentioned that perform the same or similar functions.

As used herein, the singular forms of "a," "and," and "the" include plural referents unless the context clearly dictates otherwise.

The present invention of a snagless bladed fishing lure includes a blade system 40, a hook system 50, and a weight 60. Blade system 40 may include different embodiments of a blade 401, 402, 403, and 404. Blade 401 will be used for exemplary purposes to further explain the present invention: it includes a forward surface 411, a rearward surface 412, a lower first end 413, and an opposed upper second end 414. In certain embodiments, the blade, such as blade 401, may define a longitudinal axis 415.

Blade system 40 also may include a line keeper. The line keeper may comprise a first hole 421 and, in some embodiments, a second hole 422. In other embodiments, a line keeper eyelet 423 may be glued, soldered, or welded to forward surface 411 to a blade, such as blade 403. In other embodiments a line keeper is provided by a line keeper pin 424. Line keeper pin 424 may be positioned through a blade 404 that includes one line keeper hole 421. Line keeper pin 424 may include a pin eyelet 425, a pin head 426, and a pin strut 427 located between pin eyelet 425 and pin head 426. It should be understood that pin head 426 may be flat, such as that depicted in FIG. 10, or may be bulbous, such as that depicted in FIG. 11. Still alternatively, the line keeper may comprise a line keeper handle 428. Line keeper handle 428 may be glued, soldered, or welded to forward surface 411 of a blade such as blade 403.

Snagless bladed fishing lure 30 also includes a hook system 50. Hook system 50 may constitute a connector 501, a shank 502, a hook end 503. In some embodiments, connector 501 may comprise a hook eyelet 504. In the appended figures, hook system 50 is depicted as a single shank, J-shaped hook. These depictions are for illustrative purposes only. Within the context of the present invention, a single shanked hook may be used that is J-shaped, but also alternatively a single shank hook may be used in which the shank includes offsets or other configurations. Similarly, the present invention includes hook systems 50 in which treble hooks are used, providing three or more hook ends 503. Also included within the context of the present invention is the use of two-pronged "frog hooks," which include two hook ends 503.

The present snagless bladed fishing lure invention also includes weight 60. Weight 60 may define a weight center of mass 601. In some embodiments, weight 60 may have a D-shaped cross-section that includes an approximately flat side, the approximately flat side carried by the lower first end 13 of the blade, for example, blade 401. In certain embodiments of the present invention, it may be advantageous to dispose substantially all of the mass of weight 60 forward of the rearward surface 412 of the blade, for example, blade 403.

The components of snagless bladed fishing lure 30 are assembled such that the angler's fishing line is attached to lure 30 by the line keeper, such as by attaching the line to first and second line keeper holes 421, 422. Hook system 50 is attached to blade system 40, such as by interfitting hook eyelet 504 of connector 501 through first and second hook receiver holes 431, 432, although alternative methods of connection may be used, as disclosed herein and also as may be equivalent to those methods disclosed herein. Weight 60 is carried by the blade, such as blade 401; weight 60 may be adhered to blade 401, molded upon blade 401, or by other techniques.

The sizing of the hook receiver, such as first and second hook receiver holes 431, 432, is predetermined relative to the size of connector 501, such as hook eyelet 504 or ring 70, to allow a moveable engagement of the blade, such as blade 401, relative to the hook system 50. In particular, the blade, such as blade 401, may oscillate side-to-side relative generally to the path of travel of snagless bladed fishing lure 30 during retrieval of the lure while used, relative to the path of travel of hook system 50. More or less side-to-side movement of the blade, such as blade 401, may be achieved by either increasing or decreasing, respectively, the size of the hook receiver holes 431, 432, for example, relative to the size of hook connector 501, such as hook eyelet 504 or ring 70, or, as another example, by increasing or decreasing, respectively, the size of a loop 435 relative to the size of hook eyelet 504.

Similarly, the blade, such as blade 401, may pitch relative to the hook system 50, whereby the upper second end 414 of blade 401 may be pitched closer to or further from hook end 503 or hook system 50. In some embodiments, such pitching of the blade, for example blade 404, may be performed within the plane defined by hook eyelet 504, passing through first and second hook receiver holes 431, 432. In other embodiments, such pitching may be achieved as blade system 40 moves about hook eyelet 504 with use of ring 70. In still other embodiments such pitching may be achieved as blade system 40 moves about hook eyelet 504 with use of loop 435.

Figure 1:
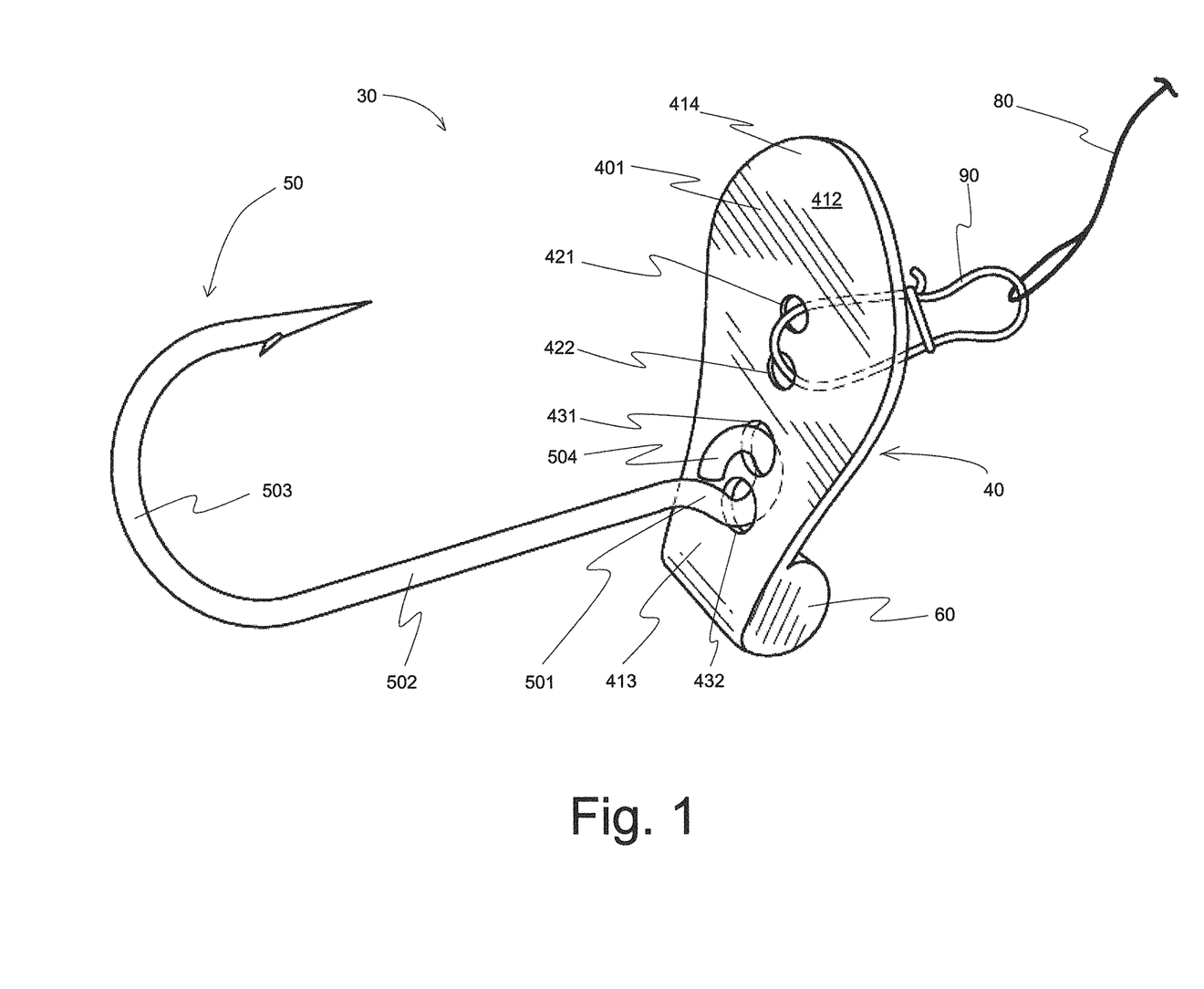
FIG. 1 is a perspective view of a snagless bladed fishing lure in accordance with certain aspects of the present invention.

FIG. 1 illustrates one embodiment of the present invention. As depicted therein, blade system 40, hook system 50, and weight 60 have been configured to provide a snagless bladed fishing lure 30. Blade system 40 includes lower first end 413, upper second end 414, and, as illustrated, rearward surface 412. Weight 60 is shown being carried by blade system 40. A conventional snap connector 90 has been attached to fishing line 80 and interfitted between upper line keeper hole 421 and lower line keeper hole 422. Likewise, a particular embodiment of hook system 50 has been provided in which hook connector 501 has been interfitted between first hook receiver hole 431 and second hook receiver hole 432. First and second hook receiver holes 431, 432 have been oriented in a vertical fashion along the blade 401. So configured, upper second end 414 may be pitched relative to hook system 50 whereby upper end 414 may be pitched closer to and/or further from hook end 503 as blade 401 may be rotated around hook eyelet 504. Likewise, blade 401 may be rolled relative to hook system 50, considering that first and second hook receiver holes 431, 432 have been over-sized relative to the size of hook eyelet 504.

Figure 2:
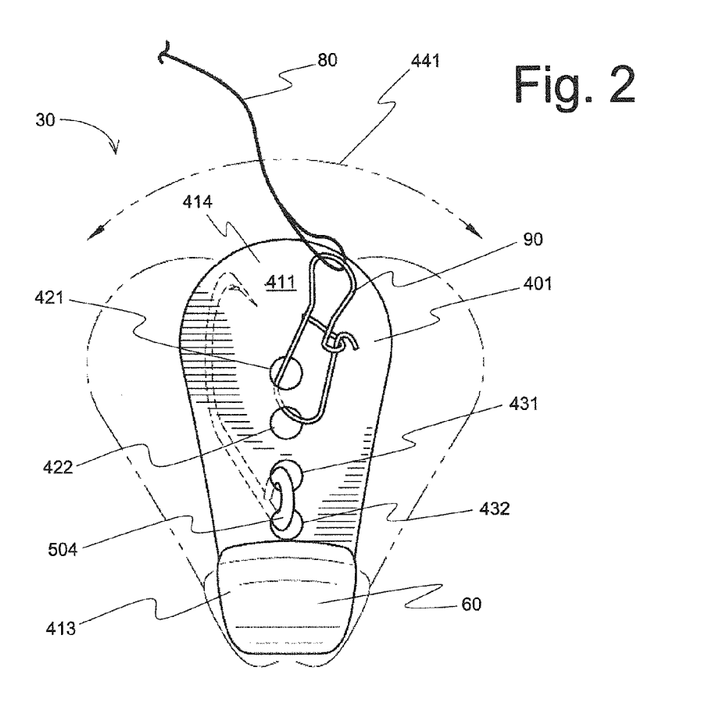
FIG. 2 is a front elevation operational illustration of a snagless bladed fishing lure in accordance with certain aspects of the present invention.

As to the last-mentioned aspect, FIG. 2 illustrates the rolling of blade 401 relative to hook system 50. Considering the size of first and second hook receiver holes 431, 432 relative to hook eyelet 504, blade 401 may oscillate back and forth along roll arc 441, creating advantageous movement of snagless bladed fishing lure 30 as it is retrieved through water.

Figure 3:
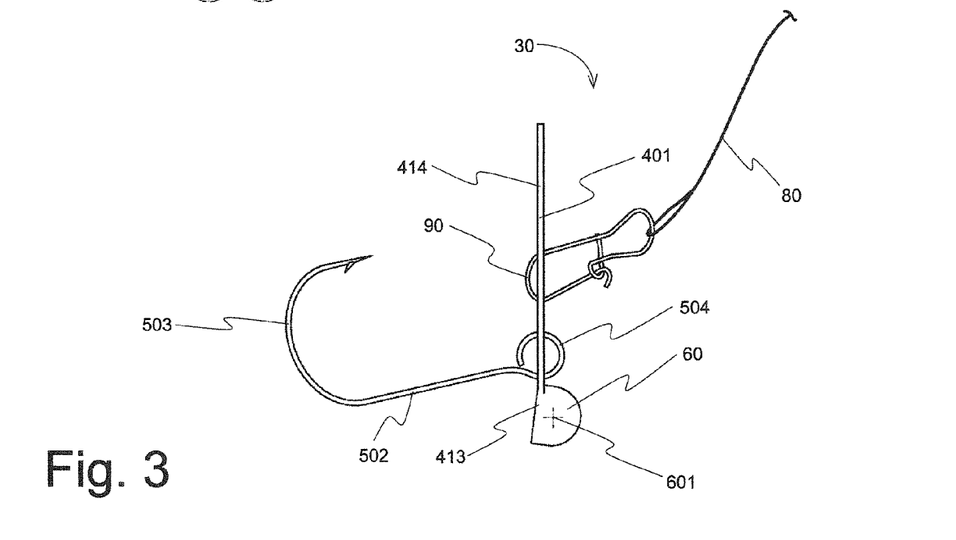
FIG. 3 is a side elevation view of a snagless bladed fishing lure in accordance with certain aspects of the present invention.

FIG. 3 depicts, among other aspects, that weight 60 may be understood to define a weight center of mass 601. As depicted in the embodiment shown in FIG. 3, weight center of mass 601 may reside forward of rearward surface 412 of blade 401.

Figure 4:
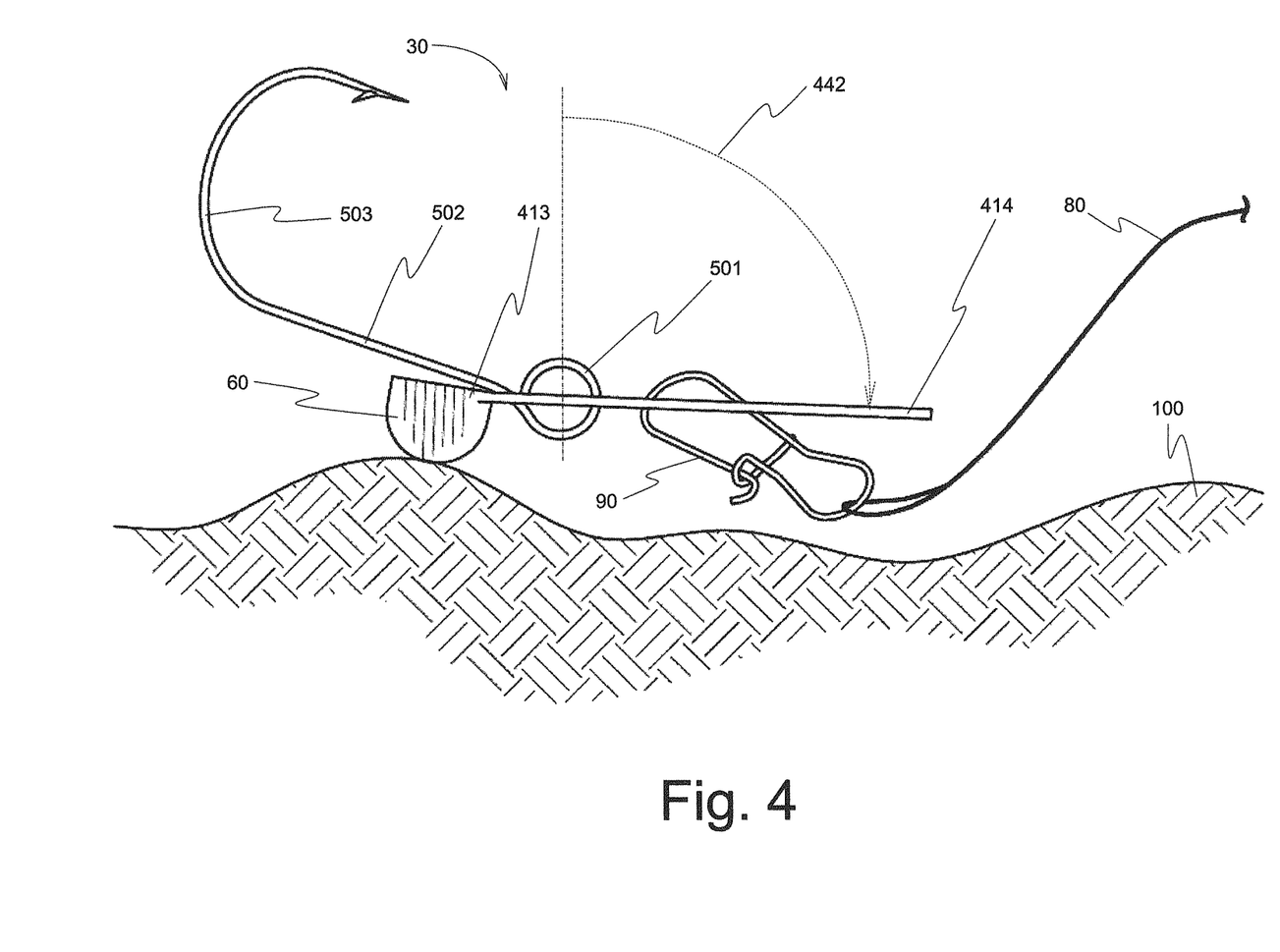
FIG. 4 is a side environmental view, showing use of a snagless bladed fishing lure in accordance with certain aspects of the present invention.

FIG. 4 illustrates use of snagless bladed fishing lure 30 environmentally in a waterway. As depicted, snagless bladed fishing lure 30 has encountered a potential snag obstacle during retrieval, in the depicted instance the obstacle being waterway floor 100. As snagless bladed fishing lure 30 is retrieved through the water and encounters waterway floor 100, weight 60 is drug backwards relative to hook system 50 and upper second end 414 pitches forward. Weight 60 thereby pushes shank 502 and hook end 503 upward, away from waterway floor 100, thereby avoiding potentially snagging waterway floor 100 with hook end 503. In certain embodiments, it may be found to be advantageous to shape weight 60 such that it presents a flat, rearward-facing surface for engagement against hook shank 502 such that, in instances such as that depicted in FIG. 4, hook shank 502 is moved away from waterway floor 100 by weight 60 but hook shank 502 is not biased, by any other shape to the rearward surface of weight 60, to move side-to-side relative to snagless bladed fishing lure 30.

Figure 5:
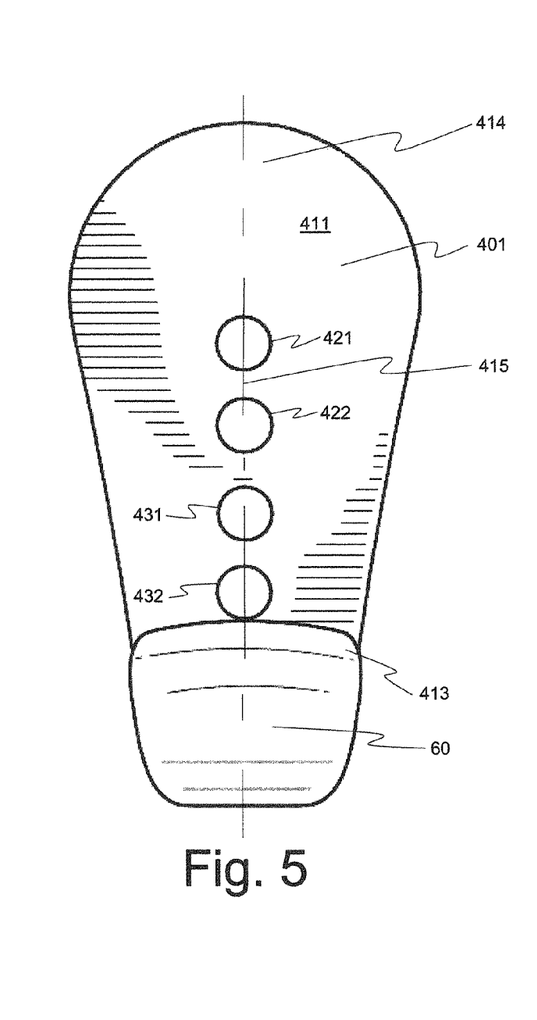
FIG. 5 is a front elevation view of a particular embodiment of a blade system in accordance with certain aspects of the present invention.
Figure 6:
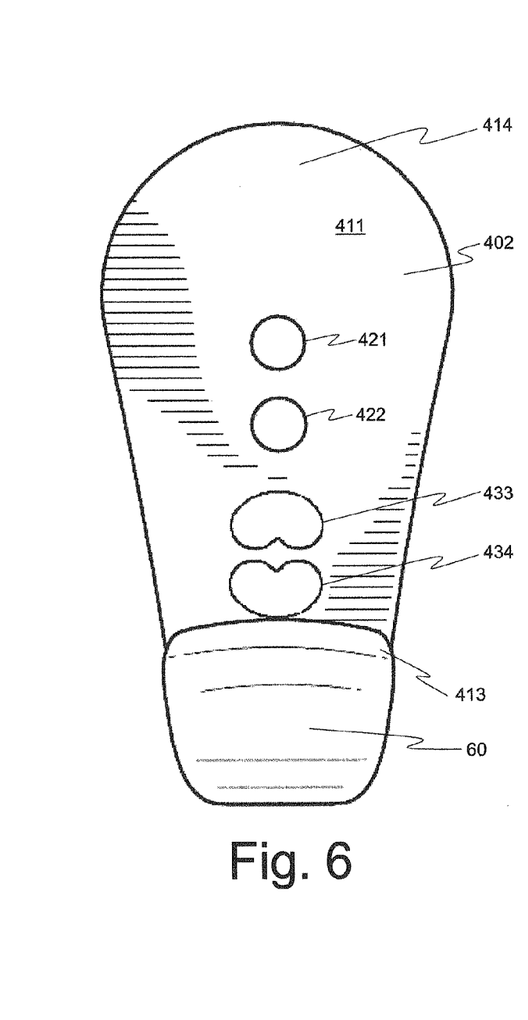
FIG. 6 is a front elevation view of a second embodiment of a blade system of a snagless bladed fishing lure in accordance with certain aspects of the present invention.

FIGS. 5 and 6 illustrate different exemplary embodiments of blade systems 40 for snagless bladed fishing lure 30. In FIG. 5, a blade 401 provides first and second line keeper holes 421, 422. First and second line keeper holes 421, 422 are shown as being oriented vertically along longitudinal axis 415, but in other embodiments may be oriented horizontally or at angular relationships to longitudinal axis 415. Similarly, FIG. 5 depicts first and second hook receiver holes 431, 432. In the illustrated embodiment, first and second hook receiver holes 431, 432 are shown as being round and oriented vertically along longitudinal axis 415. Such a configuration may be advantageous in certain embodiments, such as that depicted in FIG. 4 to allow for forward/backward pitching of blade 401 relative to hook system 50. In other embodiments, such as that shown in FIG. 12 that will be described in more detail hereinbelow, first and second hook receiver holes 431, 432 may be oriented in a horizontal fashion, perpendicular to longitudinal axis 415, to provide for advantageous use of ring 70 for engagement with hook system 50.

FIG. 6 depicts an embodiment similar to that of FIG. 5, but in which first and second elliptical hook receiver holes 433, 434 have been employed. First and second elliptical hook receiver holes 433, 434 are configure to provide greater roll arc 441 of blade 402 relative hook system 50. In certain other embodiments, a round hook receiver hole 431 or 432 may be used in conjunction with an elliptical hook receiver hole 434 or 433, respectively, to provide advantageous degrees of roll arc 441 in certain situations.

Figure 7:
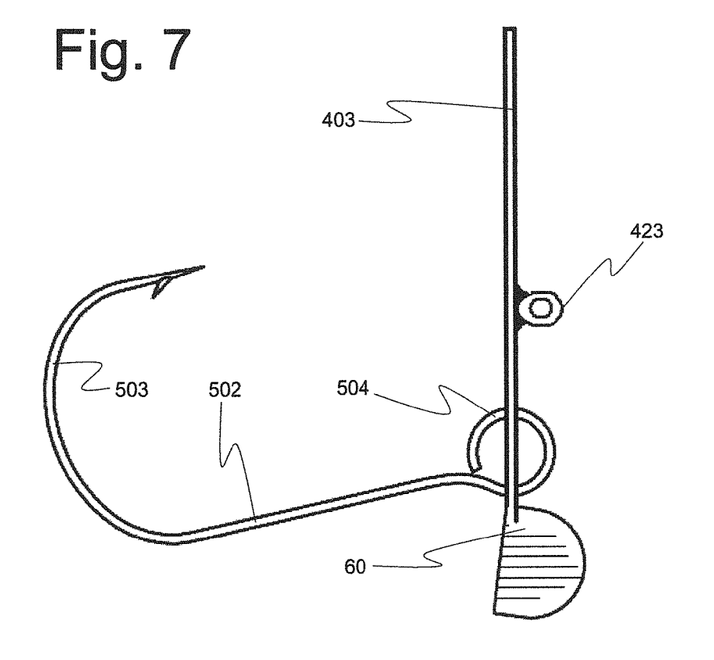
FIG. 7 is a side view of a particular embodiment of a snagless bladed fishing lure in accordance with certain aspects of the present invention.
Figure 8:
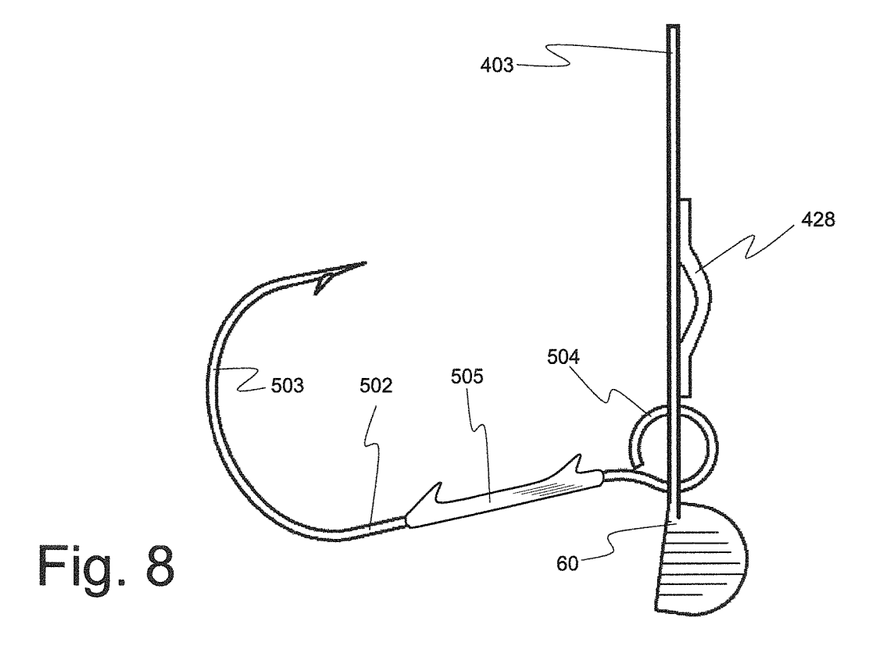
FIG. 8 is a side view of a particular embodiment of a snagless bladed fishing lure in accordance with certain aspects of the present invention.
Figure 9:
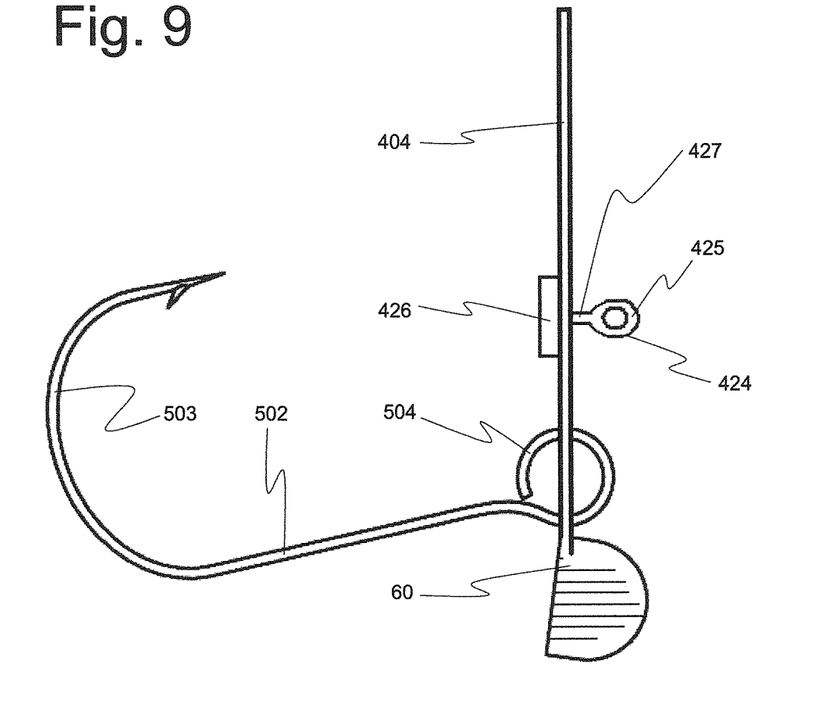
FIG. 9 is a side view of a particular embodiment of a snagless bladed fishing lure in accordance with certain aspects of the present invention.

FIGS. 7, 8, and 9 depict different embodiments of snagless bladed fishing lure 30 in which different line keepers 423, 428, and 424 have been used. In FIG. 7, line keeper eyelet 423 has been glued, welded, or otherwise adhered to forward surface 411 of blade 403. A fishing line 80 may be attached to line keeper eyelet 423, for example, by use of a snap connector 90.

In FIG. 8, a line keeper handle 428 has been provided, line keeper handle 428 may be glued, welded, or otherwise adhered to forward surface 411 of blade 403. Similarly, a fishing line may be attached to line keeper handle 428, for example by use of a snap connector 90 tied to a fishing line 80.

FIG. 8 also illustrates another aspect of the present invention that, while depicted with an embodiment having a line keeper handle 428, may be utilized in any embodiment of the present invention: dressing collar 505. Dressing collar 505 may be used in situations in which additional dressings, such as an artificial skirt, are desired to be secured to hook system 50. Although dressing collar 505 is depicted in FIG. 8 as a double-barbed collar, formed for instance by lead molded upon shank 502, dressing collar 505 may be any component of a configuration that allows a dressing to be securely attached to hook system 50, such as a plastic, rubber, lead, or scored metal sleeve affixed to shank 502.

In FIG. 9, a line keeper pin 424 has been positioned through blade 404 to provide a line keeper. Line keeper pin 424 includes pin eyelet 425, pin head 426, and pin strut 427 disposed between pin eyelet 425 and pin head 426. The snagless bladed fishing lure 30 of FIG. 9 may be used by attaching a fishing line 80 to the lure 30, by use of a snap connector 90 interfitted through pin eyelet 425.

Figure 10:
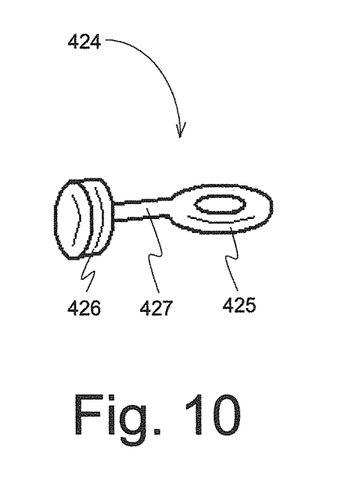
FIG. 10 is a perspective view of one embodiment of a line keeper pin in accordance with certain aspects of the present invention.
Figure 11:
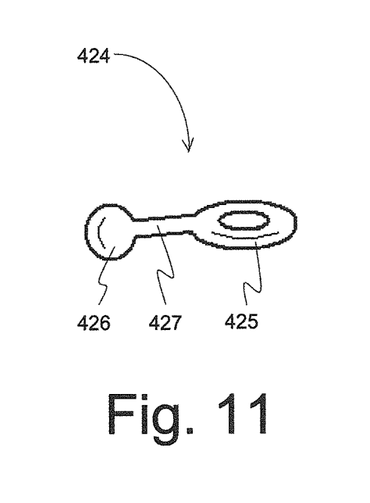
FIG. 11 is a perspective view of a particular embodiment of a line keeper pin in accordance with certain aspects of the present invention.

FIGS. 10 and 11 illustrate alternative embodiments of line keeper pin 424. In FIG. 10, pin head 426 is of a "nail head" configuration. In FIG. 11, a pin head 426 is of a bulbous configuration. Other suitable configurations, preventing line keeper pin 424 from being removed from blade 404, may also be used.

Figure 12:
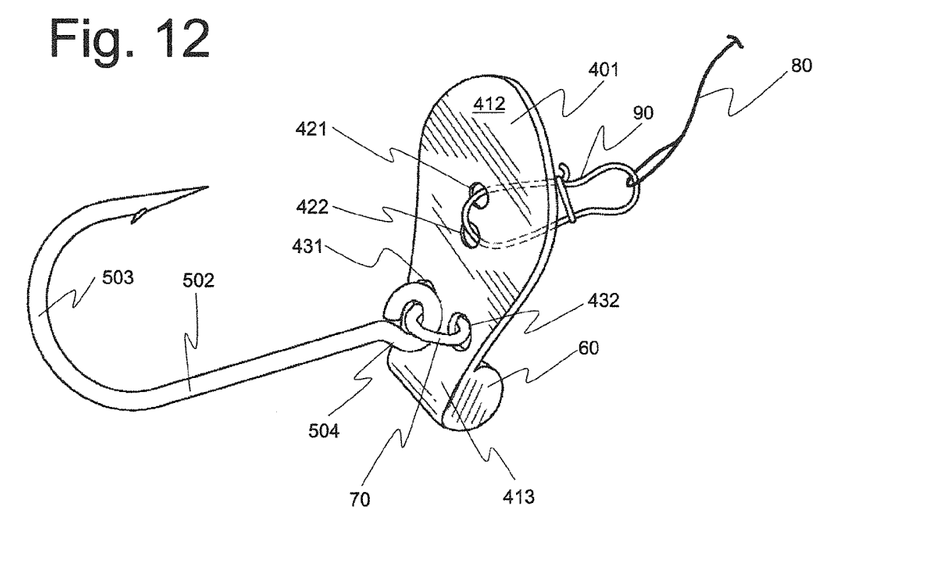
FIG. 12 is a perspective view of a particular embodiment of a snagless bladed fishing lure in accordance with certain aspects of the present invention.

As referenced above, FIG. 12 depicts an alternative embodiment of snagless bladed fishing lure 30. In the embodiment depicted in FIG. 12, a ring 70 has been interfitted between horizontally-oriented first and second hook receiver holes 431, 432. Hook eyelet 504 has been interfitted within ring 70. So configured, the rollability of blade 401, shown in a different embodiment in FIG. 2, may be achieved. Similarly, the pitchability of blade 401, as shown with a different embodiment of FIG. 4, may also be achieved.

Figure 13:
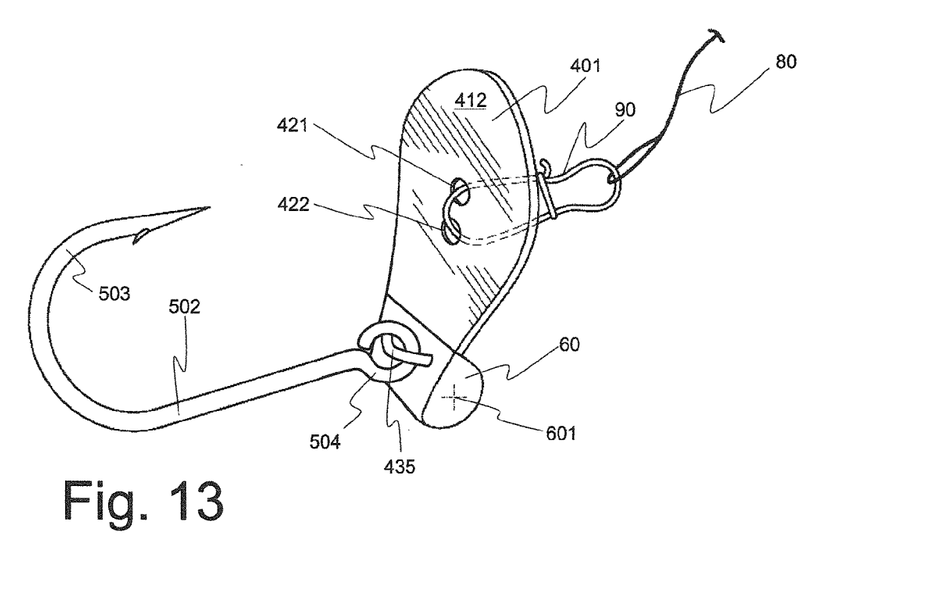
FIG. 13 is a perspective view of a particular embodiment of a snagless bladed fishing lure in accordance with certain aspects of the present invention.

FIG. 13 shows yet another embodiment of snagless bladed fishing lure 30. Therein, weight 60 is disposed proximate to lower end 413 and defines a weight center of gravity 601. Weight 60 also carries a loop 435, to which eyelet 504 has been connected. In other embodiments, not depicted, weight 60 may similarly carry an eyelet or a bail, or similar structure as a hook receiver. In the embodiment depicted in FIG. 13, loop 435 is shown as oriented horizontal to the orientation of blade 401 and hook eyelet 504 is shown as oriented vertical so as to connect with loop 435, but in other embodiments the orientation of loop 435 (or an eyelet, bail, or similar hook receiving structure) may be vertical with a corresponding horizontal orientation of hook eyelet 504. As depicted in FIG. 13, the hook receiver, such as loop 435, is located between the line keeper, such as holes 421, 422, and weight center of mass 601. Configured in any such fashion as described, the rollability of blade 401, shown in a different embodiment in FIG. 2, may be achieved. Similarly, the pitchability of blade 401, as shown with a different embodiment of FIG. 4, may also be achieved.

Figure 14:
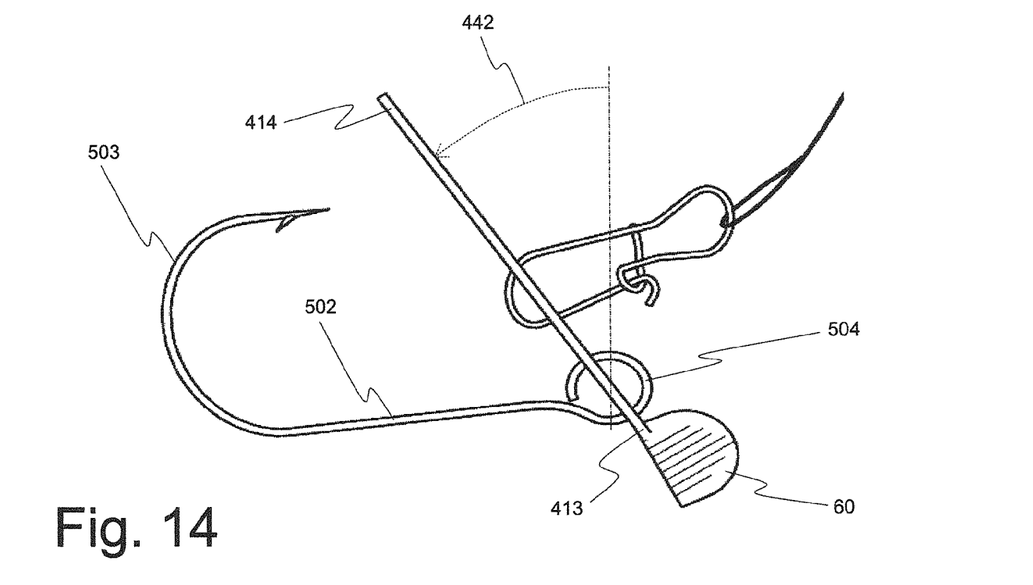
FIG. 14 is a side view of a snagless bladed fishing lure in accordance with certain aspects of the present invention.

FIG. 14 illustrates yet another aspect of the present invention snagless bladed fishing lure 30. As shown therein, the relative position of upper second end 414 relative to hook end 503 as snagless bladed fishing lure 30 is retrieved through water depends upon the hydrodynamic size of upper second end 414 relative to the mass of weight 60. In the embodiment depicted in FIG. 14, the relative size of upper second end 414 to the mass of weight 60 is such that upper second end 414 has been pitched relatively rearward along pitch 442 relative to the position of weight 60.

The relative mass of weight 60 compared to that of the blade, for example blade 401, has been found to control the movement both of blade system 40 about hook system 50 and of snagless bladed fishing lure 30 as it is retrieved through water. In certain embodiments, it may be advantageous for the blade, for example, blade 401, 402, 403 or 404, to be constructed of a clear material. So configured, snagless bladed fishing lure 30 would still achieve the advantageous movement of snagless bladed fishing lure 30 as it is retrieved through water when used with opaque and/or flashing blades, for example blade 401, but would not disadvantageously "spook" fish in particularly clear waterways by flashing light inasmuch as a clear blade 401, for example, would reflect no light. Furthermore, a snagless bladed fishing lure 30 with a clear blade, for example blade 401, likewise would impart sound from the lure to the surrounding water as the lure passes through the water without any resulting disadvantages, present in some environments, from a blade that is visible to fish. The functional movement of the blade, for example blade 401, relative to the hook system 50, both in rolling and in pitching, can remain the same whether the blade, for example blade 401, is opaque, reflective, or clear, as such movement is controlled, rather, by the shape and hydrodynamics of the blade and of the mass of weight 60 relative to the mass of the blade, for example blade 401. Whether opaque, reflective, or clear, the blade of the present invention, for example blade 401, provides snag resistance to the snagless bladed fishing lure 30.

The snagless bladed fishing lure 30, so configured, provides an elegant and efficient fishing technology. Entirely artificial components may be used, but live and artificial may likewise be used. The blade system 40 provides additional movement and can be configured to provide flashing light from retrieval of the lure 30 through water. Furthermore, the snagless bladed fishing lure 30 imparts sound from the lure to the surrounding water as the water is retrieved through the water. And the snagless bladed fishing lure 30 is configured to travel in nonlinear paths while retrieved, by reason of movement of blade system 40 about hook system 50. Furthermore, snagless bladed fishing lure 30 provides improved snag resistance without compromising its ability to effectively hook fish. Each of these aspects is achieved without frustrating the accomplishment or function of any of the other beneficial aspects.

As disclosed herein, the present invention provides snagless bladed fishing lure that includes a blade that oscillates side-to-side during retrieval but that pitches forward to protect the hook from snagging upon an obstacle. While preferred embodiments of the invention have been shown and described, modifications and variations may be made thereto without departing from the spirit and scope of the present invention. Thus, it should be understood that various embodiments may be interchanged, both in whole or in part. Furthermore, those with skill in this technology will appreciate that the foregoing description is by way of example only and is not intended to be a limitation of the invention as further described in the appended claims.

The invention claimed is:

1. A fishing lure, comprising:
a blade, the blade
(i) having a forward surface, a rearward surface opposite the forward surface, a lower first end, an, upper second end opposite the lower first end, and
(ii) including a line keeper within the upper second end:
a solitary hook receiver;
a hook, the hook including a connector and a hook end, the connector being engaged with the hook receiver, the hook extending rearwardly from the lure, the hook end residing behind the rearward surface; and
a weight, the weight disposed at the lower first end and defining a weight center of gravity, wherein the weight center of gravity resides forward of the rearward surface;
the hook receiver located along the blade between the upper second end and the lower first end.

2. The fishing lure of claim 1, wherein the blade may roll in an arc the hook.

3. The fishing lure of claim 1, wherein the blade may pitch relative to the hook.

4. The fishing lure of claim 1, wherein the connector is engaged with the hook receiver by a ring.

5. The fishing lure of claim 1, wherein the hook receiver includes at least one hole defined through the blade.

6. The fishing lure of claim 5, wherein the connector is engaged with the hook receiver by a ring, the ring disposed through the at least one hole.

7. The fishing lure of claim 5, wherein the connector includes an eyelet, the eyelet being disposed through the at least one hole defined through the blade.

8. The fishing lure of claim 1, wherein the line keeper is at least one of a hole defined through the blade, an eyelet carried by the blade, a pin extending through the blade, and a line handle.

9. The fishing lure of claim 1, wherein the blade defines a longitudinal axis extending between the lower first end and the upper second end and the blade is symmetrical about the longitudinal axis.

10. A fishing lure, comprising:
a blade, the blade having a lower end and an upper end opposite the lower end,
the upper end being wider than the lower end;
the blade having a line keeper within the upper end;
a weight, the weight carried by the blade at the lower end, disposed below the line keeper, and defining a weight center of gravity in the lower end;
a hook, the hook having a connector and a hook end;
the blade having one hook receiver, the hook receiver located between the upper end and the weight center of gravity, wherein the weight is disposed entirely below the hook receiver;
the hook attached to the lure by the connector being joined with the hook receiver;
the blade being pitchable relative to the hook whereby the upper end may be pitched closer to and further from the hook end; and
the blade being rollable relative to the hook connector whereby the upper end may travel in an arc, the center of such arc being approximately the hook connector.

11. The fishing lure of claim 10, wherein the connector is engaged with the hook receiver by a ring.

12. The fishing lure of claim 10, wherein the hook receiver includes at least one hole defined through the blade.

13. The fishing lure of claim 12, wherein the connector includes an eyelet, the eyelet being disposed through the at least one hole defined through the blade.

14. The fishing lure of claim 12, wherein the line keeper is at least one of a hole defined through the blade, an eyelet carried by the blade, a pin extending through the blade, and a line handle.

15. The fishing lure of claim 10, wherein:
the lower end has a front side and a back side opposite the front side, the weight defines a center of gravity, and the center of gravity resides forward of the back side; and
the blade defines a longitudinal axis extending between the lower end and the upper end and the blade is symmetrical about the longitudinal axis.

16. A fishing lure, comprising:
a hook, the hook having a connector and a hook end;
a blade, the blade having:
- a length;
- a lower end and an upper end opposite the lower end;
- line attaching means for attaching a liter to the blade and disposed intermediate along the length of the blade;

rolling means for rolling the blade relative to the hook;
pitching means for pitching the blade relative to the hook;
a weight, the weight carried by the blade and located entirely within the lower end and defining a weight center of gravity; and
solitary hook attaching means for attaching the hook connector directly to the blade, the hook attaching means residing proximate to the weight and proximate to the lower end, wherein the weight is disposed below the line attaching means and entirely below the hook attaching means; and
the line attaching means residing on the blade between the hook attaching means and the upper end.

17. The fishing lure of claim 16, wherein the lower end has a front side and a back side opposite the front side and the weight center of gravity resides forward of the back side.

18. The fishing lure of claim 16, wherein the blade defines a longitudinal axis extending between the lower end and the upper end and the blade is symmetrical about the longitudinal axis.

* * * * *